United States Patent
Chuang et al.

(10) Patent No.: US 11,764,599 B2
(45) Date of Patent: Sep. 19, 2023

(54) ELECTRONIC DEVICE AND STEREOPHONIC EARPHONE HAVING DUAL CHARGING ROUTES

(71) Applicant: AUDIOWISE TECHNOLOGY INC., Hsinchu County (TW)

(72) Inventors: Chia-So Chuang, Hsinchu County (TW); Jui-Liang Wang, Hsinchu County (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 17/552,582

(22) Filed: Dec. 16, 2021

(65) Prior Publication Data
US 2023/0198278 A1   Jun. 22, 2023

(51) Int. Cl.
*H02J 7/00* (2006.01)
*H04R 1/10* (2006.01)
*H04R 5/033* (2006.01)

(52) U.S. Cl.
CPC .... *H02J 7/007182* (2020.01); *H02J 7/00032* (2020.01); *H04R 1/105* (2013.01); *H04R 1/1008* (2013.01); *H04R 1/1025* (2013.01); *H04R 1/1041* (2013.01); *H04R 5/033* (2013.01)

(58) Field of Classification Search
None
See application file for complete search history.

(56) References Cited

U.S. PATENT DOCUMENTS

| | | | |
|---|---|---|---|
| 2019/0200113 A1* | 6/2019 | Kim | H02J 7/342 |
| 2022/0053255 A1* | 2/2022 | Xu | H04R 1/1016 |
| 2022/0218280 A1* | 7/2022 | Baba | A61B 5/6803 |

* cited by examiner

Primary Examiner — Kenny H Truong
(74) Attorney, Agent, or Firm — McClure, Qualey & Rodack, LLP

(57) ABSTRACT

There is provided an electronic device including a battery, a first chip, a second chip and a communication bridge connecting the first chip and the second chip. The first chip is used to detect a voltage of the battery to determine a charging current, and to transmit information associated with the charging current to the second chip to cause a charging curve of the second chip to match that of the first chip.

10 Claims, 4 Drawing Sheets

ELECTRONIC DEVICE AND STEREOPHONIC EARPHONE HAVING DUAL CHARGING ROUTES

BACKGROUND

1. Field of the Disclosure

This disclosure generally relates to charging an electronic device and, more particularly, to an electronic device and a stereophonic earphone that use dual charging routes to perform a parallel charging which conforms to a preset charging curve of a battery.

2. Description of the Related Art

To charge a battery, such as lithium battery, it is known that the constant current constant voltage (CC-CV) charging can avoid damaging battery and avoid dangerous condition during the charging process.

In some scenarios, the usage time of a device can be extended by using a high capacity lithium battery, but the high capacity lithium battery also needs to be charged by a higher charging current so as to reduce the charging interval. Meanwhile, not all of charging circuits can provide enough charging current. For example, an integrated charger in the Bluetooth chip has a limitation on charging current. Conventionally, it is able to use an alternative high current charger to charge a high capacity lithium battery in replace of using an embedded charger of a Bluetooth chip, but the intension of embedding a charger is wasted.

Accordingly, the present disclosure provides a charging system having two charging routes without using an alternative battery charger.

SUMMARY

The present disclosure provides an electronic device and a stereophonic earphone that employ two charging circuits with matched battery charging curves so as to adequately play the merit of using two charging routes.

The present disclosure further provides an electronic device and a stereophonic earphone that use a detection circuit of one charging circuit to detect the voltage change of a battery. Said one charging circuit further informs another charging circuit regarding the charging process so as to avoid the mismatch between two charging curves.

To achieve the above objectives, the present disclosure provides an electronic device including a battery, a first chip, a bridge and a second chip. The battery has a voltage. The first chip is configured to detect the voltage of the battery to determine a charging current to the battery. The second chip is coupled to the first chip via the bridge, and configured to receive charging information associated with the charging current from the first chip to accordingly charge the battery.

Furthermore, the present disclosure further provides an electronic device including a battery, a first chip, a bridge and a second chip. The battery has a voltage. The first chip is configured to detect the voltage of the battery when the electronic device is coupled to an external power source to determine a time point of reducing a first charging current of the first chip. The second chip is coupled to the first chip via the bridge, and configured to receive information associated with the time point from the first chip when the electronic device is coupled to the external power source so as to reduce a second charging current of the second chip to the battery corresponding to the time point.

Furthermore, the present disclosure further provides a stereophonic earphone including a first earphone, a bridge and a second earphone. The first earphone includes an embedded battery and an adaptor port. The second earphone is coupled to the first earphone via the bridge. When the first earphone is coupled to an external power source via the adaptor port, the first earphone and the second earphone charge the battery at the same time.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The electronic device of the present disclosure is to use two charging routes or paths to charge the same battery so as to reduce total charging time. In one aspect, to match charging curves of the two charging routes, a charging circuit of only one charging route is used to detect a voltage of the battery, and the other charging route is ceased (e.g., turned off or bypassed) to detect a battery voltage or the detected battery voltage is ignored without being used.

Figure 1:
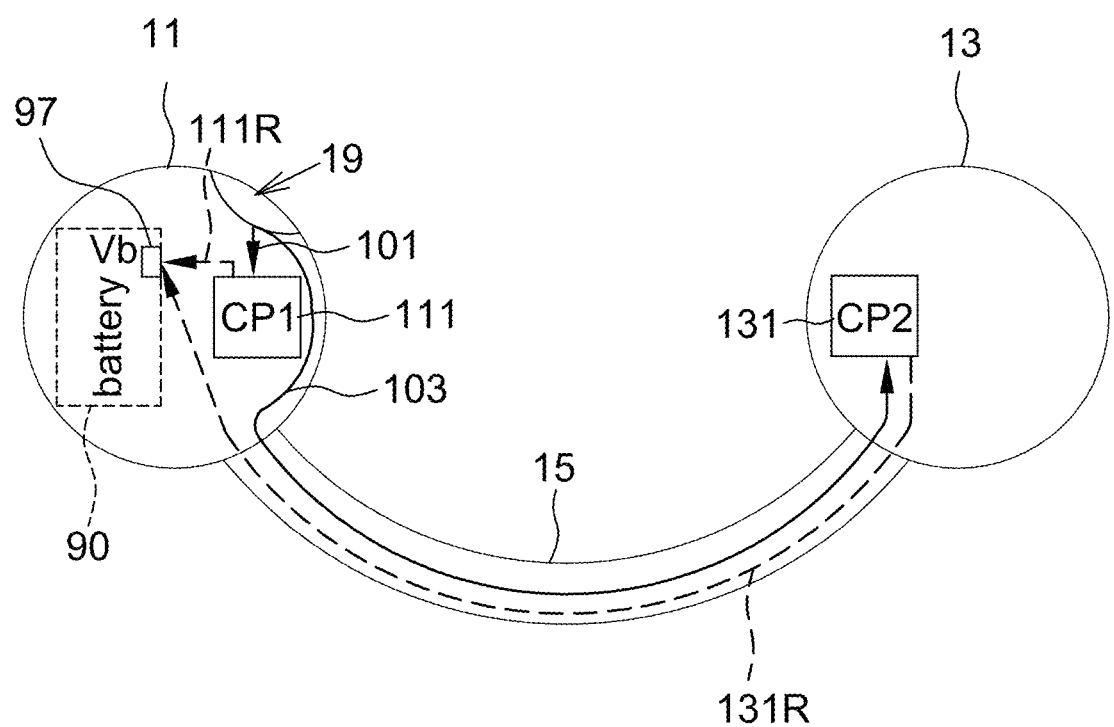
FIG. 1 is a schematic diagram of an electronic device with dual charging routes according to a first embodiment of the present disclosure.

Please refer to FIG. 1, it is a schematic diagram of an electronic device 100 with dual charging routes (shown as dashed lines) according to a first embodiment of the present disclosure. The electronic device 100 is, for example, a stereophonic earphone, which includes a first earphone (e.g., left earphone) 11 and a second earphone (e.g., right earphone) 13, and the first earphone 11 and the second earphone 13 are connected via a bridge 15. The bridge 15 is cladded by plastic material or rubber material for being protected and easily worn on the user's head. The communication protocol between the bridge 15 and each of the earphones 11 and 13 is selected from an I2C bus, an SPI bus, a universal asynchronous receiver transmitter (UART) bus or a transmission line conformed to other transmission protocol without particular limitations The first earphone 11 includes a first chip (further shown as CP1) 111, an adaptor port 19 and a battery 90. The battery 90 is, for example, a lithium battery, but not limited to. Preferably, the battery 90 has high capacity, e.g., 500 mAh, but not limited to. The second earphone 13 includes a second chip (further shown as CP2) 131.

The adaptor port 19 has any suitable structure without particular limitations as long as an external power source (not shown) is coupled to the electronic device When an adaptor is plugged into the adaptor port 19 so as to provide electricity to the first chip 111 and the second chip 131 via power lines 101 and 103, respectively. The external power source provides electricity for the operation of chips and battery charging.

In one aspect, to reduce the manufacturing cost, the first chip CP1 and the second chip CP2 have an identical hardware structure, and both the first chip CPI and the second chip CP2 have a charging circuit for charging the battery 90. To accelerate the charging speed, both the first chip CP1 and the second chip CP2 are used to charge the battery 90 via a respective charging route.

The first chip 111 and the second chip 131 are, for example, Bluetooth chips, and are integrated with the function of charging the battery 90 when receiving power from an external power source via the power lines 101 and 103, respectively. For example, FIG. 1 shows that the first chip CPI charges the battery 90 via a charging route 111R and a battery electrode 97, and the second chip CP2 charges the battery 90 via a charging route 131R and the battery electrode 97. In one aspect, the charging current provided by each of the first chip CP1 and the second chip CP2 is about 0.5 C=250 mA, but not limited to. Therefore, when the adaptor port 19 on the first earphone 11 is coupled to an external power source, the first earphone 11 and the second earphone 11 are charging the battery 90 via the battery electrode 97 at the same time.

Figure 2:
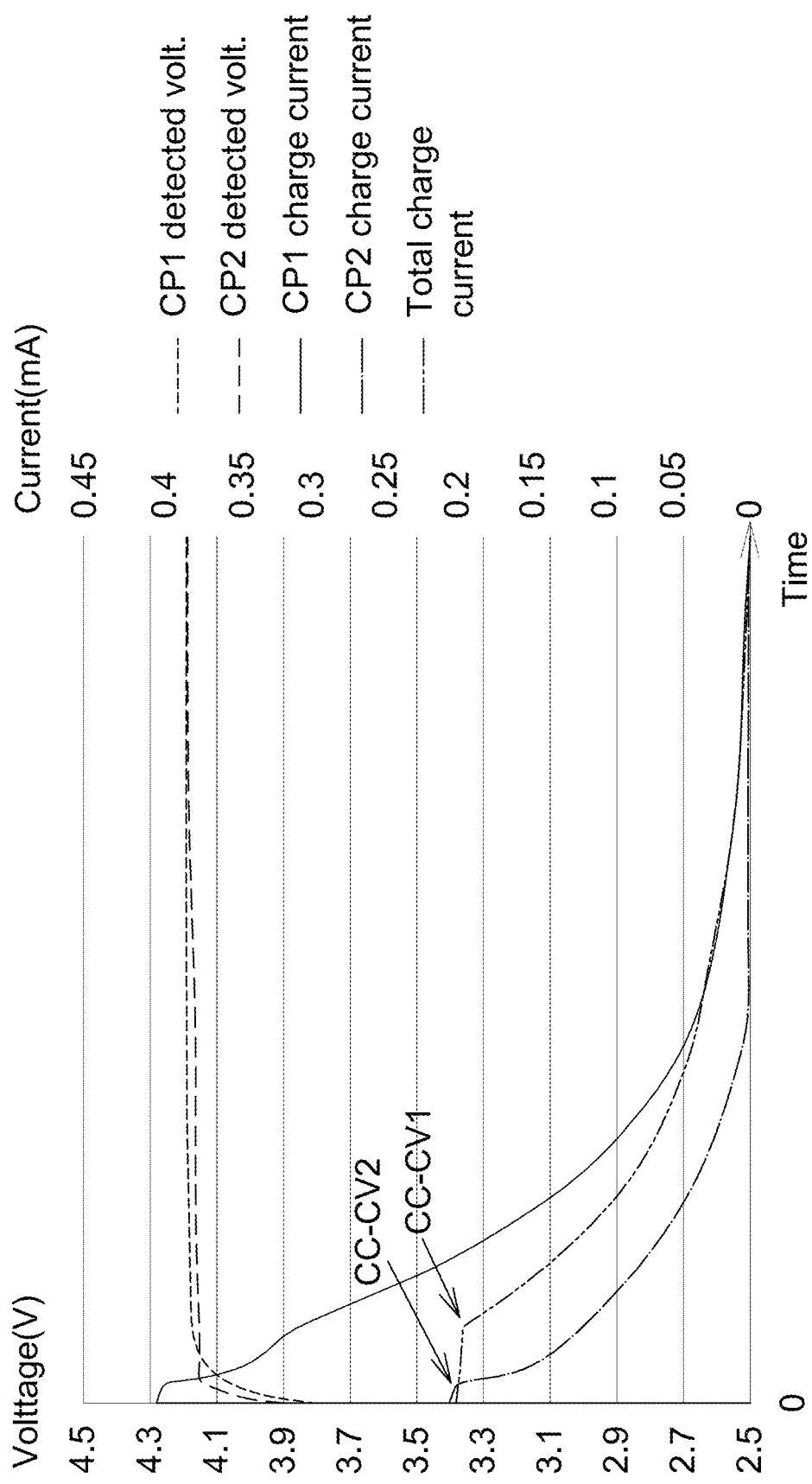
FIG. 2 is a schematic diagram of current curves and voltage curves of the electronic device with dual charging routes in FIG. 1.

Please refer to FIG. 2, it shows current variations and voltage variations of the first earphone (or the first chip CP1) and the second earphone 13 (or the second chip CP2) during charging the battery 90. Because the second earphone 13 detects a voltage Vb of the battery 90 passing a longer detecting path (e.g., 131R.) during charging the battery 90, the resistor in the detecting path causes the second earphone 13 to detect a higher voltage Vb (compared with a detected value of the first earphone 11) in the constant current stage such that a second charging curve of the second earphone 13 enters a constant current-constant voltage (CC-CV) transition earlier to be mismatch to a first charging curve of the first earphone 11. A voltage detecting path of the first earphone 11 is 111R as an example. For example, FIG. 2 shows that a transition time CC-CV2 is earlier than a transition time CC-CV1 such that the total charging current, formed by summing a first charging current and a second charging current, decreases earlier to degrade the charging performance.

Figure 3:
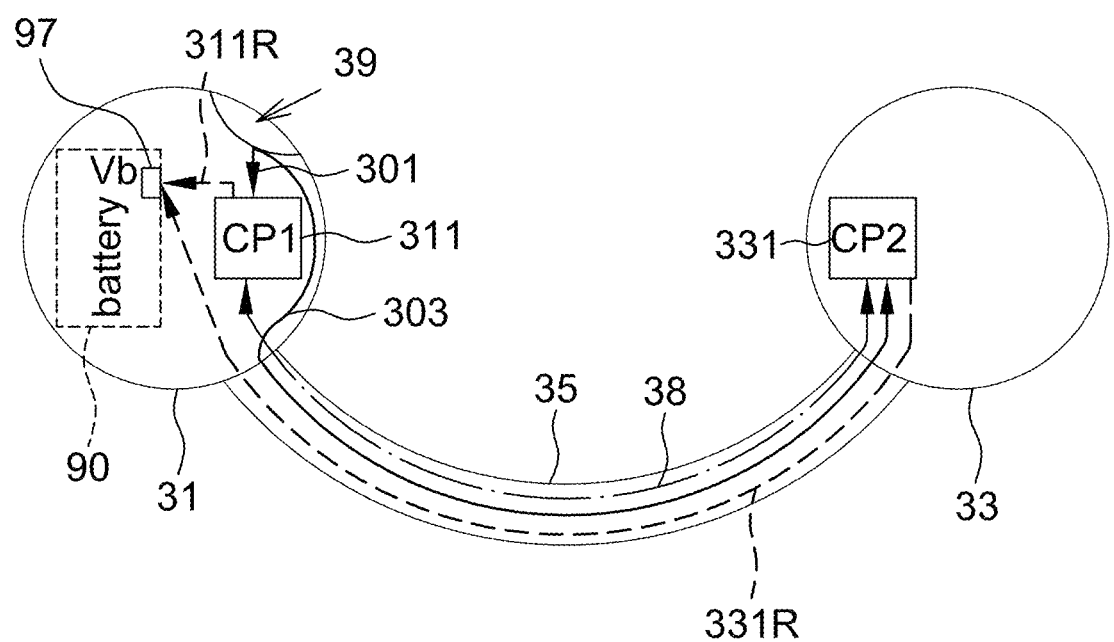
FIG. 3 is a schematic diagram of an electronic device with dual charging routes according to a second embodiment of the present disclosure.

In another embodiment, the present disclosure further provides an electronic device that has a first charging curve and a second charging curve matching to each other. Please refer to FIG. 3, it is a schematic diagram of an electronic device 300 with dual charging routes according a second embodiment of the present disclosure. The electronic device 300 also includes a first device (e.g., left earphone) 31 and a second device (right earphone) 33. Although being connected together by a bridge 35, the first device 31 and the second device 33 have a respective chip for controlling respective operations.

The first device 31 includes a first chip (also shown as CP1) 31 and an adaptor port 39, which respectively have an identical electrical structure as the above first chip 111 and adaptor port 19. The first device 31 is also arranged with a battery 90, which is preferably charged by a preset charging curve. The second device 33 has a second chip (also shows as CP2) 331, which has an electrical structure identical to the above second chip 131.

The second embodiment is different from the first embodiment in that the second embodiment is embedded with a firmware to control one of the first chip CP1 and the second chip CP2 to detect a battery voltage and to control the other one not to detect the battery voltage, even though said the other one chip is integrated with a voltage detection circuit. An example is illustrated hereinafter.

In the second embodiment, the first chip CP1 detects a voltage Vb of the battery 90 and determines a first charging current for charging the battery 90 via a charging route 311R. For example, FIG. 2 shows that when the electronic device 300 is coupled to an external power source (i.e. an adaptor plugged into the adaptor port 39), the first chip CP1 draws power from a power line 301, and detects the voltage Vb of the battery 90 and determines time point(s) at which the first charging current is decreased, e.g., including a transition time at CC-CV1 and other time points behind CC-CV1.

The second chip CP2 is connected to the first chip CP1 via the bridge 35 so as to receive charging information (or information of every time point) from the first chip CP1 via a communication path 38 in the bridge 35 to accordingly charge the battery 90. For example, when the electronic device 300 is coupled to an external power source, the second chip CP2 receives power from a power line 303, and receives information associated with the time point(s) from the first CP1 via the communication path 38 to decrease a second charging current to the battery 90 thereof corresponding to the received time point(s). In one aspect, the second chip CP2 does not detect the voltage Vb of the battery 90 while charging the battery 90 via the charging route 331R. The communication path 38 adopts the communication protocol selected from an I2C bus, an SPI bus, a universal asynchronous receiver transmitter (UART) bus or a transmission line conformed to other transmission protocol without particular limitations.

Figure 4:
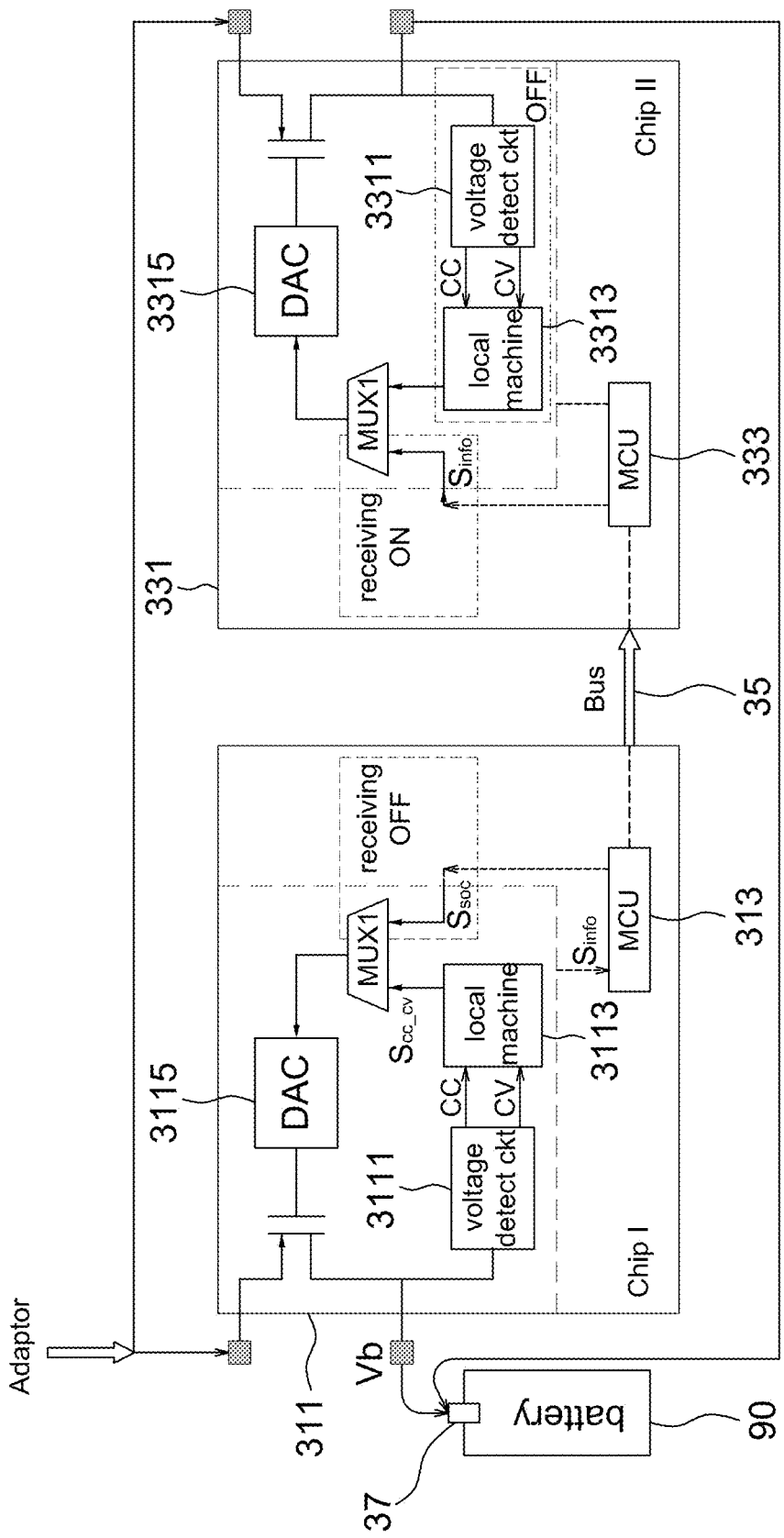
FIG. 4 is a block diagram of chips of an electronic device with dual charging routes according to a second embodiment of the present disclosure.

Please refer to FIG. 4, it is a schematic block diagram of the first chip 311 and the second chip 331 of the electronic device 300 under a charging mode. The first chip 311 and the second chip 331 have identical circuits, e.g., both being Bluetooth chips. In addition to transmitting information associated with charging current, the bridge 35 further transmits synchronizing data and audio data between the first chip 311 and the second chip 331 according to different operating modes of the Bluetooth chips. For example, when the Bluetooth chip is under a snoop mode, the bridge 35 does not transmit audio data; whereas, when the Bluetooth chip is under a relay mode, the bridge 35 transmits audio data, wherein details of the snoop mode and the relay mode are known to the art and not a main objective of the present disclosure, and thus are not described herein. The bridge 35 also includes a charging route 331R.

The first chip 311 includes a first charging circuit and a micro controller unit (MCU) 313. The first charging circuit performs a function of charging the battery 90, and includes a first voltage detection circuit (shown as voltage detect clot) 3111, a local machine 3113, a first multiplexer MUX1 and a first digital to analog converter (DAC) 3115. The MCU 313 is coupled to the first charging circuit and performs functions excluding battery charging, e.g., said functions including exchanging messages with the second chip 331 via the bridge 35 and performing functions of Bluetooth chip. The local machine 3113 is a digital circuit such as an application specific integrated circuit (ASIC) or a field programmable gate array (FPGA), but not limited to.

The second chip 331 includes a second charging circuit and an MCU 333. The second charging circuit performs a function of charging the battery 90, and includes a second voltage detection circuit (shown as voltage detect ckt) 3311, a local machine 3313, a second multiplexer MUX2 and a second digital to analog converter (DAC) 3315. The MCU 333 is coupled to the second charging circuit and performs functions excluding battery charging, e.g., said functions including exchanging messages with the first chip 311 via the bridge 35 and performing functions of Bluetooth chip. The local machine 3313 is also a digital circuit such as an ASIC or a FPGA.

In the second embodiment, the first chip CP1 is coupled to an external power source (e.g., via an adaptor) without passing through the bridge 35, and the second chip CP2 is coupled to the external power source via the bridge 35. When the electronic device 300 is being coupled to the external power source (e.g., under a charging mode), the first chip CP1 and the second chip CP2 are charging the battery 90 via respective charging routes 311R and 331R. In another aspect, the first chip CP1 is coupled to an external power source without passing through the bridge 35, and the second chip CP2 is coupled to the external power source via the first chip CP1 and the bridge 35.

In one aspect, when the electronic device 300 is being coupled to the external power source, the charging circuit of the second chip CP2 does not detect a voltage Vb of the battery 90, and the charging circuit of the second chip CP2 receives charging information from the first chip CP1 via the MCU 333 thereof. For example, the MCU 333 of the second chip CP2 is arranged to turn off or bypass the voltage detection circuit 3311 (and the local machine 3313 optionally) of the charging circuit in the second chip CP2 to stop the voltage detection function of the charging circuit of the second chip CP2. In this way, the first chip CPI and the second chip CP2 both charge the battery 90 according to the charging current of CPI (shown as CP1 charge current in FIG. 2) to obtain matched charging curves.

In another aspect, the charging circuit of the second chip CP2 is not turned off even under the charging mode and is still kept operation to detect the voltage Vb of the battery 90. However, the charging circuit of the second chip CP2 does not decrease a second charging current to the battery 90 according to the voltage Vb of the battery 90 detected thereby, but decreases the second charging current to the battery 90 according to the information (e.g., time points mentioned above) received from the first chip CP1.

For example, operation of the electronic device 300 under the charging mode includes: (1) before the voltage Vb of the battery 90 detected by the voltage detection circuit 3111 reaches a predetermined voltage (e.g., 4.2 volt., but not limited to), digital values of CC=1 and CV=0 are sent to the local machine 3113, which sends a corresponding control signal Scc_cv to the MUX1. In this case, the MUX1 is arranged not to receive a signal Ssoc from the MCU 313 (e.g., turned off or bypassed), and the DAC 3115 controls the PMOS switch to perform constant current charging only according to the control signal Scc_cv; (2) when the voltage Vb of the battery 90 detected by the voltage detection circuit 3111 reaches the predetermined voltage, digital values of CC=0 and CV=1 are sent to the local machine 3113, which sends a corresponding control signal Scc_cv to the MUX1 to reduce the charging current thereby preventing the battery voltage from increasing continuously, i.e. entering so called constant voltage charging in which when the charging current is reduced, the detected battery voltage Vb is decreased at the same time; and (3) repeatedly perform the above steps (1) and (2) till the battery charging is accomplished. Details of the process of CC-CV charging are known to the art, and the present disclosure is to determine the CC-CV charging curve by one of two charging circuits.

Meanwhile, in the above steps, the local machine 3113 transmits the received digital values regarding CC and CV values to the MCU 313, e.g., shown as information Sinfo. When the MCU 313 is informed with digital values of CC=0 and CV=1, the information Sinfo is sent to the MCU 333 via the bridge 35 or another dedicated signal line (e.g., only for sending information Sinfo).

As mentioned above, the second chip 331 has a structure identical to the first chip 311. After entering the charging mode, the voltage detection circuit 3311 and the local machine 3313 are turned off or bypassed, and the second DAC 3315 controls the PMOS switch only according to the information Sinfo (i.e. received via MUX2) to determine a second charging current to the battery 90. That is, when the transition time point CC-CV1 of the first charging curve is reached, the second charging curve also starts the CC-CV transition. The second charging current is not reduced at the transition time point CC-CV2 shown in FIG. 2.

According to the above operation and in the application of stereophonic earphone, When the adaptor port 19 (or 39) of the first earphone 11 (or 31) is coupled to an external power source, the first earphone 11 (or 31) detects a voltage Vb of the battery 90, and the second earphone 13 (or 33) does not detect the voltage Yb of the battery 90. The first earphone 11 (or 31) determines charging information (e.g., Sinfo) to the battery 90, and transmits the charging information Sinfo to the second earphone 13 (or 33) via the bridge 15 (or 35) or via an additional dedicated signal line.

It should be mentioned that although the adaptor port 19 (or 39) is shown to be arranged only on one of the first device 11 (or 31) and the second device 13 (or 33), the present disclose is not limited thereto. In other aspects, both of the first device 11 (or 31) and the second device 13 (or 33) are arranged with a respective adaptor port for being coupled to an external power source. In the case that the battery 90 is still arranged in the first device 11 (or 31), no matter which of the first device 11 (or 31) and the second device 13 (or 33) is plugged with an adaptor, the stereophonic earphone still operates as the embodiments mentioned above since the first chip is closer to the batter 90.

It should be mentioned that although in the above embodiments the second chip CP2 determines the charging current thereof directly according to the charging information from the first chip CP1, the present disclosure is not limited thereto. In other aspects, the first chip CP1 transmits (e.g., via MCU 313) a first battery voltage detected thereby to the second chip CP2 to calibrate a second battery voltage detected by the second chip CP2, and the second chip CP2 determines the charging current thereof according to the calibrated second battery voltage, e.g., the first battery voltage being added to or subtracted from the second battery voltage by a MCU 333 at first to determine the charging current of the second chip CP2.

It should be mentioned that although the above embodiments are illustrated by taking a stereophonic earphone as an example, the present disclosure is not limited thereto. The electronic device of the present disclosure is suitable to any electronic device that uses two chips to charge the same battery at the same time.

It should be mentioned that although the above embodiments are illustrated by using two charging routes as an example, the present disclosure is not limited thereto. In other aspects, more than two charging routes are used to charge the same battery, and a battery voltage under charging is detected by a charging circuit of one charging route, which then informs other charging circuits with the detected battery voltage so as to match multiple charging curves to one another.

It should be mentioned that although the above embodiments are illustrated by using a signal line (e.g., bridge) to transmit the charging information, the present disclosure is not limited thereto. In other aspects, the charging information is transmitted by using a wireless communication technique.

As mentioned above, to charge a lithium battery, it is preferably to use the so called CC-CV charging to improve the charging performance. However, in the case that two charging paths are used to charge a battery at the same time, it is possible that two charging curves do not match to each other. Therefore, the present disclosure further provides an electronic device and a stereophonic earphone with dual charging routes (e.g., FIGS. 3-4) that use a single charging circuit to determine charging curves of both charging routes so as to eliminate the extension of charging time unwillingly.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An electronic device with at least two charging routes, comprising:
   a battery, having a voltage;
   a first chip, coupled to the battery and configured to charge the battery via a first charging route, the first chip further configured to detect the voltage of the battery to determine a charging current to the battery;
   a bridge; and
   a second chip, coupled to the first chip and the battery via the bridge, and configured to receive charging information associated with the charging current from the first chip and, accordingly, charge the battery via a second charging route,
   wherein the first charging route is shorter than the second charging route.

2. The electronic device as claimed in claim 1, wherein
   the first chip and the second chip have an identical circuit, and
   the second chip does not detect the voltage of the battery during charging the battery.

3. The electronic device as claimed in claim 1, wherein the bridge adopts a communication protocol selected from an I2C bus, an SPI bus or a universal asynchronous receiver transmitter bus.

4. The electronic device as claimed in claim 1, wherein
   the first chip and the second chip are Bluetooth chips, and
   the bridge is further configured to transmit synchronizing data and audio data between the first chip and the second chip.

5. The electronic device as claimed in claim 1, wherein the first chip and the second chip respectively comprise:
   a charging circuit, configured to charge the battery using the charging current, and
   a micro controller unit (MCU), coupled to the charging circuit and configured to exchange messages via the bridge.

6. The electronic device as claimed in claim 5, wherein in a charging mode, the first chip and the second chip respectively charge the battery at the same time using the charging circuit thereof.

7. The electronic device as claimed in claim 6, wherein in the charging mode, the charging circuit of the second chip is configured to
   bypass the voltage of the battery, and
   receive the charging information from the first chip via the MCU of the second chip.

8. The electronic device as claimed in claim 6, wherein in the charging mode, the MCU of the second chip turns off a voltage detection circuit of the charging circuit of the second chip.

9. The electronic device as claimed in claim 1, wherein the first chip and the second chip charge the battery at the same time via the first charging route and the second charging route, respectively, according to a same charging curve.

10. The electronic device as claimed in claim 1, wherein the second chip does not detect the voltage of the battery while charging the battery.

* * * * *